US012730744B2

(12) United States Patent
Jumani et al.

(10) Patent No.: US 12,730,744 B2
(45) Date of Patent: Sep. 8, 2026

(54) WINDOW-BASED MEMORY DEPENDENCY PREDICTOR

(71) Applicant: Tenstorrent USA, Inc., Austin, TX (US)

(72) Inventors: Reshma C Jumani, Austin, TX (US); Miles Robert Dooley, Austin, TX (US); Deepak Panwar, Austin, TX (US); Luke Yen, Woodinville, WA (US); Apurv Ravindra Narkhede, Santa Clara, CA (US); Alexander C. Rucker, Santa Clara, CA (US)

(73) Assignee: Tenstorrent USA, Inc.

( * ) Notice: Subject to any disclaimer, the term of this patent is extended or adjusted under 35 U.S.C. 154(b) by 0 days.

(21) Appl. No.: 19/067,080

(22) Filed: Feb. 28, 2025

(65) Prior Publication Data

US 2025/0328456 A1 Oct. 23, 2025

Related U.S. Application Data

(60) Provisional application No. 63/636,102, filed on Apr. 18, 2024.

(51) Int. Cl.
*G06F 12/02* (2006.01)
*G06F 9/38* (2018.01)

(52) U.S. Cl.
CPC ........ *G06F 12/0223* (2013.01); *G06F 9/3834* (2013.01); *G06F 9/3838* (2013.01)

(58) Field of Classification Search
None
See application file for complete search history.

(56) References Cited

U.S. PATENT DOCUMENTS

| | | | | |
|---|---|---|---|---|
| 6,065,105 | A * | 5/2000 | Zaidi | G06F 9/3836 712/23 |
| 2013/0326198 | A1* | 12/2013 | Meier | G06F 9/3834 712/216 |
| 2015/0309792 | A1* | 10/2015 | Meier | G06F 9/3826 712/225 |
| 2022/0358039 | A1 | 11/2022 | Favor et al. | |

OTHER PUBLICATIONS

Chrysos et al. (Memory Dependence Prediction using Store Sets) (1998 IEEE, pp. 142-153) (Year: 1998).*
International Search Report and Written Opinion dated Jun. 26, 2025 from International Application No. PCT/US25/23089, 11 pages.

* cited by examiner

*Primary Examiner* — Kaushikkumar M Patel
(74) *Attorney, Agent, or Firm* — Daylight Law, P.C.

(57) ABSTRACT

Methods and systems for out-of-order processing are disclosed herein. A disclosed method for out-of-order instruction processing includes identifying a first load instruction for processing, determining, based on the first load instruction, whether a store instruction window has been established for the first load instruction, confirming, when the store instruction window has been established, that one or more store instructions, within the store instruction window, that the first load instruction is dependent upon have been executed, and executing the first load instruction after execution of the one or more store instructions has been confirmed.

24 Claims, 8 Drawing Sheets

110 I-Cache

120 Scheduler

130 Load – Store

140 Memory

Processor 150

Registers 155

200
202
Execute Load
204
Execute Store
206
Dependent on UnEx Store?
No
Yes
208
Flush Load
210
Fetch Load
212
Set Pointer
214
Set Vector
Set/Update Confidence Value
216
218
Next Load in Table?
No
Yes
220
Get Pointer
222
Get Vector
224
Execute Store(s)
226
Stores Complete?
No
Yes
228
Execute Load
230
Dependent on UnEx Store?
No
Yes

FIG. 3

| Load ID | Conf Val | DepVec[W:0] | Pointer |
|---|---|---|---|
| x18, 0(x11) | 4 | 00101100 | 2 |
| x17, 0(x13) | 1 | 10000101 | 2 |
| x18, 0(x12) | 3 | 00010001 | 0 |
| ⋮ | | | |
| x16, 0(x10) | 0 | 11101100 | 3 |
| x17, 0(x11) | 5 | 00001101 | 1 |

500
501
0 0 0 0 0 1 1 1 2
sb x14, 0(x11)
19 - # store byte value 1
sb x15, 1(x11)
20 # store byte value 2
sb x16, 2(x11)
21 - # store byte value 3
sw x17, 4(x11)
22 - # store byte value 4
*
sb x8, 4(x13)
23
lw x18, 0(x13)
*
sb x17, 0(x14)
24
ld x18, 0(x11)
Load depends 600
601
sb x14, 0(x10)
20
sb x14, 4(x10)
21
sb x14, 0(x11)
22 - # store byte value 1
sb x14, 0(x14)
23
sb x15, 1(x11)
24 - # store byte value 2
sb x16, 2(x11)
25 - # store byte value 3
sb x15, 4(x14)
26
sw x8, 8(x12)
27
sw x17, 4(x11)
28 - # store byte value 4
*
sb x8, 4(x13)
29
lw x18, 0(x13)
*
sb x17, 0(x14)
30
ld x18, 0(x11)
Load depends
0
0
1
0
1
1
0
0
2

600
601
0
1
1
0
0
1
0
0
0
sb x14, 0(x10)
20
sb x14, 4(x10)
21
sb x14, 0(x11)
22
sb x14, 0(x14)
23
sb x15, 1(x11)
24 - # store byte value 2
sb x16, 2(x11)
25 - # store byte value 3
sb x15, 4(x14)
26
sw x8, 8(x12)
27
sw x17, 4(x11)
28 - # store byte value 4
sb x8, 4(x13)
29
lw x18, 0(x13)
sb x17, 0(x14)
30
sb x18 , 1(x11)
31 - # store byte value 1
ld x18, 0(x11)
Load depends
*
*

WINDOW-BASED MEMORY DEPENDENCY PREDICTOR

CROSS REFERENCE TO RELATED APPLICATIONS

This application claims the benefit of U.S. Provisional Patent Application No. 63/636,102 filed on Apr. 18, 2024, which is incorporated by reference herein in its entirety for all purposes.

BACKGROUND

In a computer processing pipeline, load instructions and store instructions play crucial roles in data manipulation. Load instructions are responsible for fetching data from memory into registers, facilitating the retrieval of operands required for subsequent computational tasks. These instructions typically involve specifying a memory address from which data is to be loaded and transferring it to the processor's internal storage. Conversely, store instructions perform the opposite function by transferring data from registers back into memory locations. This process allows for the preservation and persistence of computation results or intermediate values. Both load and store instructions are integral to the efficient functioning of the pipeline, ensuring that data flows smoothly between memory and the processor, thus enabling seamless execution of programs and operations.

Out-of-order execution, where instructions are executed not strictly in the order they appear in the program, may potentially provide efficiencies in overall processing time. However, in pipelines that employ out-of-order execution, complications may arise with load and store instructions. In an out-of-order execution scenario, instructions dependent on the data loaded or stored by other instructions may proceed before those other instructions complete, potentially leading to incorrect results. When such dependencies are violated, the processing pipeline needs to be flushed, halting the execution of subsequent instructions and discarding any incorrect results. This flushing process ensures that the pipeline returns to a consistent state, allowing correct execution to resume. However, it is time consuming and inefficient to conduct a flush operation followed by a subsequent fetch operation, as other pending operations need to wait for this process to be completed. Performing this flush and fetch procedure frequently substantially diminishes the advantages of out-of-order execution.

SUMMARY

Systems and methods related to out-of-order execution for instructions in computer processing pipelines are disclosed herein. In specific embodiments of the invention, a data structure is used to track multiple memory dependencies for load instructions. The data structure can include a window of prior instructions and a pointer to the window starting point. In this manner, the present disclosure enables precise tracking of a dependency on any older stores within a window of N stores, with minimal cost beyond tracking of only a single dependency. This approach is superior to alternative approaches because it provides more assurance that a load instruction is ready to be executed with minimal computational or storage overhead. This results in a cost-effective mechanism to enable tracking of multiple memory dependencies for a single load instruction.

High performance processor designs allow loads to speculatively execute out of order and provide a mechanism to track when that speculation is potentially incorrect. As described above, when the speculation is potentially incorrect, the processor will take a corrective action, such as discarding or flushing the results of those loads and then fetching and executing them again. This corrective action is expensive in terms of performance, so high performance designs employ predictors to decide when it is safe for loads to execute out of order, and when it is potentially unsafe. In general, these predictors might try to identify whether a specific load instruction is dependent on an older store instruction and which specific store instruction a load is dependent on. When that specific load instruction is seen again, if it is predicted to be dependent upon an older store, then the load is prevented from executing until the predicted older store instruction has been executed. In some cases, there might be more than one older store which the load is dependent upon. Existing solutions have difficulty in this situation, leading to a loss of accuracy in the predictions, which in turn degrades performance. For example, if only a single store instruction were tracked (e.g., the closer or newer store instruction in the program) then the system could assume that a load instruction was ready for execution by mistake as other store instructions on which the load instruction was dependent may not have been executed yet.

In some embodiments disclosed herein a prediction mechanism is provided which can track multiple dependencies in an efficient way. When a load instruction having a store dependency is identified, a window of older stores which can be tracked is defined, such as by combining a pointer to the youngest older store upon which the load is dependent, along with a bit-vector which corresponds to the first N older stores than the one being pointed to. The combination of these two pieces of information allows the predictor to indicate a dependency between the load and (N+1) stores in a window of store instructions (the store at the pointer, plus N more older stores).

In specific embodiments, a method for out-of-order instruction processing is provided. The method comprises identifying a first load instruction for processing, determining, based on the first load instruction, whether a store instruction window has been established for the first load instruction, confirming, when the store instruction window has been established, that one or more store instructions, within the store instruction window, that the first load instruction is dependent upon have been executed, and executing the first load instruction after execution of the one or more store instructions has been confirmed.

In specific embodiments, a system for out-of-order instruction processing is provided. The system comprises means for identifying a first load instruction for processing, means for determining, based on the first load instruction, whether a store instruction window has been established for the first load instruction, means for confirming, when the store instruction window has been established, that one or more store instructions, within the store instruction window, that the first load instruction is dependent upon have been executed, and means for executing the first load instruction after execution of the one or more store instructions has been confirmed.

In specific embodiments, a system for out-of-order instruction processing is provided. The system comprises an instruction cache configured to fetch instructions for execution in a processor pipeline, a scheduler coupled to the instruction cache and configured to schedule and predict order of execution of instructions for the processor pipeline, a load-store module coupled to the scheduler and configured to execute load and store instructions, memory, communicatively coupled to the load-store module for storing data associated with execution of instructions, and one or more processors, each with a plurality of registers. Wherein the load-store module is configured to identify a first load instruction for processing, determine, based on the first load instruction, whether a store instruction window has been established for the first load instruction, confirm, when the store instruction window has been established, that one or more store instructions, within the store instruction window, that the first load instruction is dependent upon have been executed, and execute the first load instruction after execution of the one or more store instructions has been confirmed.

BRIEF DESCRIPTION OF THE DRAWINGS

The accompanying drawings illustrate various embodiments of systems, methods, and other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1 is a diagram illustrating an instruction pipeline in accordance with specific embodiments of the invention.

FIG. 3 is an example of a data dependency data structure in accordance with specific embodiments of the invention.

DETAILED DESCRIPTION

Figure 2:
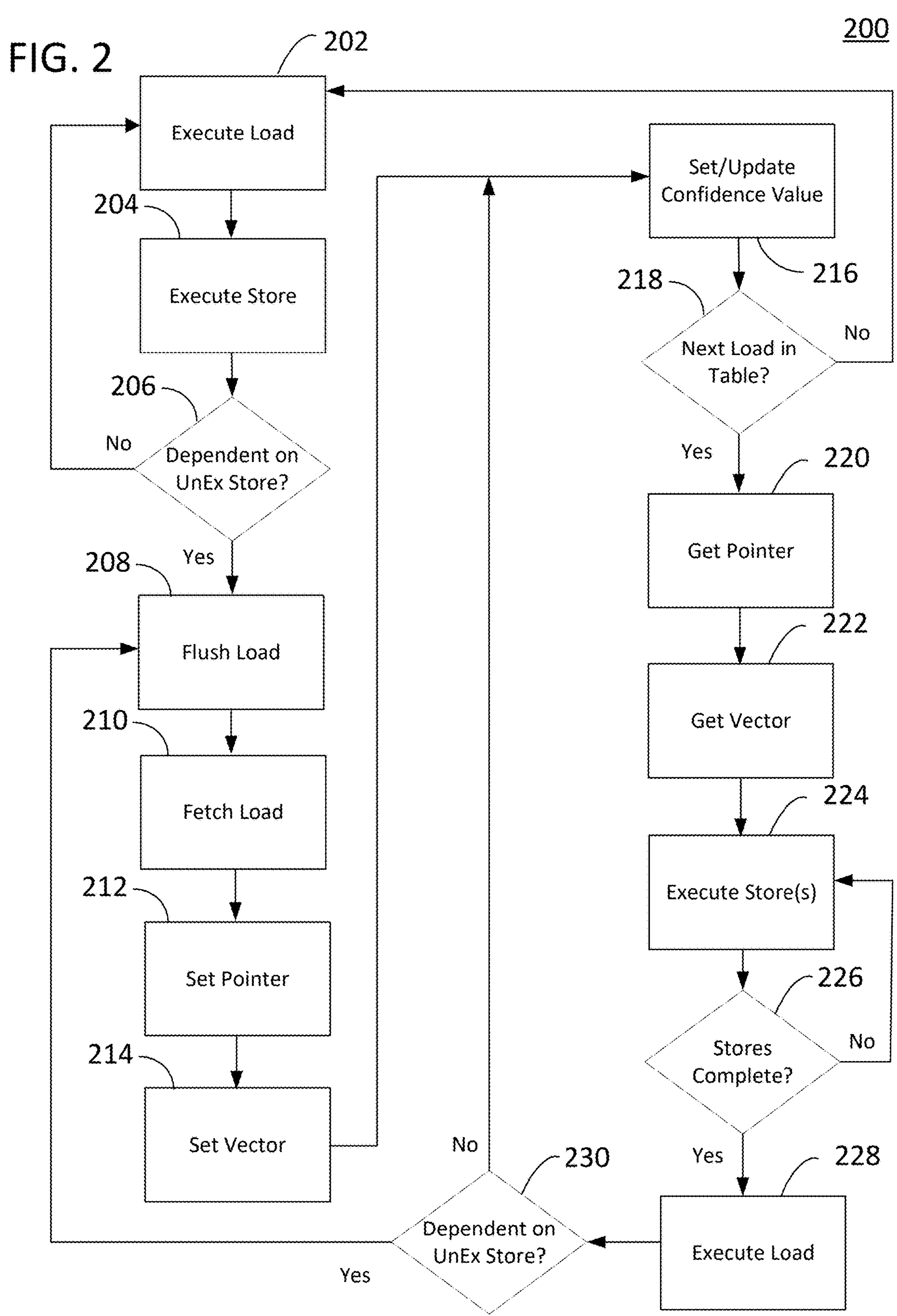
FIG. 2 is a diagram of a process of window-based memory dependency prediction in accordance with specific embodiments of the invention.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Methods and systems related to out-of-order execution for instructions in computer processing pipelines in accordance with the summary above are disclosed in detail herein. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Figure 1:
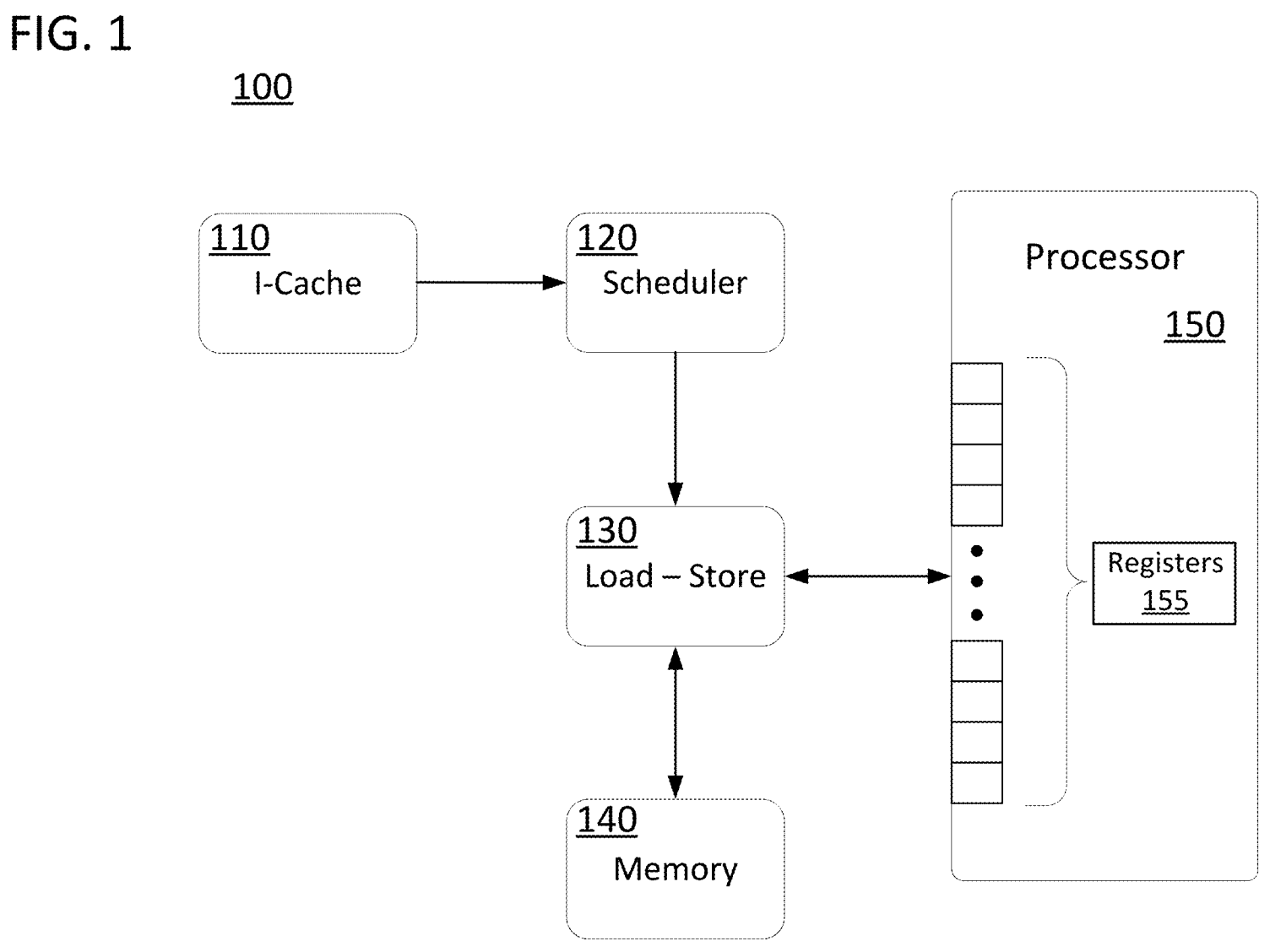

Systems including instruction pipelines with predictive capabilities used in accordance with the approaches disclosed herein can have various architectures. FIG. 1 depicts an exemplary instruction pipeline 100 in accordance with an embodiment of the present disclosure. Although particular components are depicted in a certain configuration in FIG. 1, it will be understood that the depiction of FIG. 1 is simplified for purposes of depicting relevant aspects of the present disclosure, and that additional components may be utilized in an instruction pipeline, components may be removed or reconfigured, and other modifications may be performed in embodiments of the present disclosure. In the embodiment depicted in FIG. 1, an instruction pipeline 100 includes an instruction cache 110 (e.g., an "I-cache"), a scheduler 120, a load-store module 130, memory 140, and a processor 150 containing registers 155. Although these components are depicted as independent hardware components, it will be understood that certain components may be combined, and that each of the components may be implemented in hardware, software, and combinations thereof. Each of the components may be implemented with a variety of architectures and combinations thereof. For example, a processor may be a suitable processor such as a central processing unit "CPU", reduced instruction set computer ("RISC") processor, graphics processing unit ("GPU"), tensor processing unit ("TPU"), or combinations thereof, while memory can include a variety of memory types and combinations thereof, such as scratch pad memory, high-bandwidth memory, double data rate ("DDR") memory, various levels of cache memory, static random-memory ("SRAM"), dynamic random-access memory ("DRAM"), and the like.

An exemplary I-cache 110 distributes instructions for execution. For example, in a high-speed processing architecture, an I-cache may be in communication with one or more processors 150, which can have one or more cores to process and distribute instructions, such as load instructions, store instructions, and arithmetic instructions. An I-cache often assigns instruction ID tags for quick identification of instructions during later scheduling, though in specific embodiments, instruction ID tags can be assigned by a fetch unit containing the I-cache. Instructions are distributed in a particular sequence and may have dependencies upon each other. In particular, load instructions may be dependent on store instructions. Within the sequence of instructions that are being executed, one or more store instructions (e.g., storing data from a register that has been updated by a processor to a location(s) in the memory) may be required to have been executed prior to a load instruction (e.g., loading data from the location(s) in the memory to a register of the processor for further processing by the processor). If the load instruction were to execute prior to the execution of all store instructions from which it depends, the load instruction may be providing incorrect or stale data to the register for further processing, resulting in errors. Accordingly, the execution of instructions is monitored. If it turns out that a store instruction from which a load instruction depends executes after the load instruction, the value loaded to the register has to be flushed and processing of further instructions that may need to utilize the value within the register must be delayed while the correct value is fetched from memory. Such events are computationally expensive and impose substantial delays in high-speed processing architectures.

A scheduler 120 and load-store module 130 coordinate the exchange of data between registers of the processor and the memory, including the transfer of data from memory 140 to registers 155 (load instructions) and the transfer of data from registers 155 to memory 140 (store instructions). The scheduler 120 can identify and queue instructions based on various criteria, determining or predicting dependencies as well as execution sequence. The scheduler can use a hardware-based decoder to scan incoming instructions for load instructions based on identification tags. In an alternative, the load-store module 130 can use software-based methods to flag instructions identified as load instructions and parse associated store instructions. In many instances, it is desirable to perform out-of-order execution of load and store instructions. For example, even though the I-cache 110 distributes instructions in a particular order (e.g., with associated sequential values indicating the order of the instructions), high-speed processing may be aided by executing some instructions such as load instructions out of order, for example, to provide a loaded value to a register of a processor earlier and allowing immediate processing of that value. Often, any dependencies of the load instruction may be satisfied (e.g., based on prior store instructions) well before the load instruction is scheduled for execution and it may be most efficient to execute the load instruction earlier within the set of instructions to be executed. A scheduler can utilize dependency prediction to attempt to determine which load instructions are suitable for out-of-order execution and which load instructions are dependent on store instructions that are unlikely to have been completed. As an example, a dependency predictor may identify a store instruction that previously resulted in a dependency error in a previously executed load instruction, and may keep a record of identifiers of the load and store instruction such that the load instruction is no longer allowed to execute before the store instruction. While such a dependency predictor helps to avoid some dependency errors in out-of-order execution of instructions, these dependency predictors fail to accurately predict dependency conditions where a load instruction has multiple dependencies, as often occurs in more complex processing and instruction pipelines.

In some embodiments, a window-based dependency predictor allows accurate dependency prediction for load instructions having dependencies upon multiple store instructions, with minimal hardware, storage, and processing cost. In an example, a scheduler monitors a window of multiple store instructions that are known to have a dependency relationship with a particular load instruction. When a particular load instruction arrives at the load-store unit for potential out-of-order execution, the multiple store instructions within the window are analyzed to confirm that all the relevant store instructions for the dependency have been executed. For example, the load instruction is identified based on an identifier of the load instruction, and a data record of dependency information for the load instruction is accessed. The data record includes information about the window of store instructions, such as a bit mask vector to distinguish between sequentially numbered store instructions that the load instruction is dependent upon versus store instructions that are not relevant to the load instruction. In some embodiments, the data record also includes a pointer to the first store instruction that the load instruction is dependent upon, which avoids having to store information about intervening store instructions that are irrelevant to the store instruction and maximizes the number of relevant store instruction dependencies that may be tracked in a bit vector of limited size within the data record for the load instruction. In this manner, out-of-order execution of load instructions can be performed with fewer dependency errors and their associated processing overhead.

FIG. 2 depicts exemplary steps 200 of window-based memory dependency prediction in accordance with an embodiment of the present disclosure. Although particular steps are depicted as being executed in a certain order, in some embodiments steps may be added or removed, and the order of the execution of steps may be modified.

Processing initially begins at step 202, for example, prior to any load instructions being previously identified as being dependent on one or more store instructions. Accordingly, a load instruction may be executed, for example, based on an out-of-order instruction execution criteria, to load a register of the processor with a value from memory. The load instruction includes information such as an identifier unique to the instruction as well as a sequential numbering of the load instruction within the instructions that have been distributed from the I-cache and the scheduler. Once the load instruction executes, processing may continue to step 204. Step 202 can also occur after a next load instruction has been selected and evaluated in later step 218.

At step 204, a store instruction that preceded the load instruction in distribution from the I-cache (e.g., as indicated by the respective sequential numbering of the store instruction and the load instruction) is executed. For example, the store instruction may cause a location in memory to be updated with a value from a register of the processor. Once the store instruction has been executed, processing continues to step 206.

At step 206, it is determined whether the previously executed load instruction was dependent upon the later-executed store instruction. For example, based on the instruction identifiers, the memory locations updated and accessed, and/or the register locations updated and accessed, it may be determined that the load instruction executed at step 202 was dependent upon the store instruction executed at step 204. This step can also check a load-store queue or similar structure such as an execution status monitor to determine if there are pending store instructions that are tagged by the scheduler as dependencies of the previously executed load instruction. In such an instance, the load instruction of step 202 should not have been executed out-of-order with the store instruction of step 204, and processing continues to step 208 to take appropriate remedial action and to store information about the dependency error (e.g., in a dependency window data structure by creating a store instruction window based on the store instruction of step 204) to avoid future dependency errors due to out-of-order execution for the load and store instructions. If there was no dependency error, processing loops back to step 202 for other instructions to be executed as described herein.

At step 208, the result of the load instruction is flushed, for example, by clearing the value of the register that was updated by the load instruction such that the processor will not attempt to perform further operations based on the value in that register. This can be accomplished using hardware rollback mechanisms such as a reorder buffer or an execution unit to clear erroneous values from associated registers, or by software exception handlers that detect dependency violations and flush results. Results from any load-dependent instruction can also be flushed at this time. Once the result has been flushed, processing continues to step 210.

At step 210, the load instruction is fetched such that it is executed again. For example, the flushed load instruction is re-issued to the instruction queue for re-execution after the new dependent store instruction completes. This can also be accomplished using an instruction queue adjustment module to reorder instructions. Because step 210 occurs after the dependency error has been identified, the proper value of at least the new store instruction of step 204 (and in some cases data from other new dependent store instructions) is now stored in its appropriate memory location. In some instances, it may turn out that a load instruction is dependent on multiple stores, with the processing of steps 202-206 repeated after an initial dependency error and it being determined that yet another dependency error has occurred. In such an instance, the flush and fetch of steps 208 and 210 would be repeated, and the pointer and window values updated further as described herein. After the fetching is completed, processing continues to step 212.

At step 212, a pointer value of the dependency window data structure is updated, for example, to select a beginning store instruction location of a store instruction window for the particular load instruction. The pointer is associated in the dependency window data structure with the Load ID of the load instruction that had a dependency error to enable later steps to quickly identify whether this load instruction has a store instruction window established. The pointer value is an offset value, relative to the load instruction within the numbered sequence of instructions, to the youngest store instruction that caused the dependency error. Thus, the first time a dependency error occurs for a particular load instruction the pointer value will be an offset to the store instruction that resulted in the dependency error. On subsequent instances in which another store instruction results in a dependency error, the pointer points to the youngest one (e.g., having the closest sequence number to the load instruction) of the multiple store instructions that cause the dependency. Thus the pointer is updated to point to the newest additional store instruction. Where there are multiple store instructions that may potentially result in a dependency error, the other store instructions other than the youngest instruction are identified within the bit vector in step 214. Once the pointer value is established, the processing continues to step 214.

At step 214, a bit vector of the dependency window data structure is updated, for example, to identify each of the store instructions that a load instruction is dependent upon for the store instruction window for the particular load instruction. As an example, the bit vector may include a set number of bits with each bit corresponding to a store instruction that is distributed in sequence prior to the store instruction corresponding to the pointer. In an example of binary bit vector values, a first value (e.g., 1 or 0) indicates that the load instruction is dependent upon the store instruction while a second value (e.g., the other of 0 or 1) indicates that the load instruction is not dependent on that store instruction. Accordingly, in some embodiments a store instruction window for a particular load instruction includes a pointer to a newest store instruction dependency and a bit vector of older store instructions in the sequence of instructions with the bit vector values indicating which additional store instructions the load instruction is dependent upon. Bits within the bit vector may be shifted to refer to different store instructions based on the new location of the pointer, and so they will be updated to maintain previously recognized store dependencies including the one that might have been referenced only by the pointer previously. Once the pointer and bit vector values are set, the store instruction window has been updated and processing continues to step 216.

At step 216, in some embodiments, a dependency window data structure may also include a confidence value which is indicative of a confidence that the store instruction window is complete and accurately includes the relevant store instructions, such that execution of the load instruction after execution of all of the identified store instructions identified by the store instruction window is highly unlikely to result in a dependency error. For example, where the confidence value corresponds to a higher confidence of no dependency error if the load instruction is executed in accordance with its store instruction window, out-of-order execution may be performed in accordance with the store instruction window with little risk of a flush and fetch being required. Confidence values may be used to optimize instruction execution such as by limiting out-of-order execution of low confidence value load instructions in high traffic conditions. The confidence values can be set in a variety of manners, such as by incrementing or decrementing a counter value based on a number of successful executions of a load instruction based on its store instruction window. Confidence values can also be set or adjusted dynamically using data such as number of associated dependent store instructions, or other heuristics such as analyzing past dependency data. Processing then continues to step 218.

At step 218, a next load instruction arrives for execution and is checked to see whether a store instruction window has been established for that load instruction. The load instruction can be identified by the associated Load ID assigned by the I-cache. This enables the instruction queue to identify which instruction is next to evaluate for execution. To determine if the store instruction window has been established, for example, the dependency window data structure is checked for an identifier for the next load instruction. If the load instruction is not yet in the dependency window data structure, no store instruction dependencies have been identified and processing returns to step 202 to execute the load instruction. In this case, it is determined that a store instruction window has not been established for this load instruction. If there is a store instruction window for the load instruction, processing continues to step 220; in this case, because of the presence of the store instruction window for the load instruction, the load instruction is prevented from being executed at this point. In some embodiments, other metadata may be present in the dependency window data structure that aids in this decision step.

At step 220, the dependency window data structure is accessed to acquire the pointer of the store instruction window for the load instruction to be executed. The pointer value may be a counter value of store instructions that are older than the load instruction to be executed, for example, with a value of zero corresponding to the first store instruction before the load instruction, a value of one corresponding to the second store instruction before the load instruction, and so on. The pointer value thus points to the newest store instruction that the load instruction is dependent upon. Once the pointer value is accessed processing continues to step 222.

At step 222, the dependency window data structure is accessed to acquire the bit vector of the store instruction window for the load instruction to be executed. The bit vector may be a set of bits with each bit associated with one store instruction of a set of subsequent (e.g., older) store instructions from the store instruction identified by the pointer. Although a bit vector may have different total numbers of bits to accommodate different total numbers of store instructions to be tracked, in an embodiment of a bit vector having eight bits, each bit of the bit vector is associated with one store instruction and the bits are arranged such as with the first bit corresponding to a first store instruction before the store instruction identified by the pointer, the second bit corresponding to a second store instruction before the store instruction identified by the pointer, etc. Values of the bits can be based on whether the load instruction is dependent upon the corresponding store instruction, for example, with a value of "1" indicating that the load instruction is dependent on the store instruction and a value of "0" indicating that the load instruction is not dependent on the store instruction. In this manner, as many as nine store instructions (e.g., for an eight-bit bit vector) for a load instruction dependency may be tracked, although in many instances there will be intervening store instructions within the instructions of the bit vector that the load instruction is not dependent upon. Once the bit vector is accessed, processing continues to step 224. In some embodiments, other store instructions can be tracked using a different data structure which includes a set of indicators corresponding to various store instructions that may be dependencies.

At step 224, a store instruction corresponding to the pointer or the bit vector is executed. In some embodiments, store executions can be tracked in a completion buffer in the load-store module. Alternatively, the load-store module can include a load-store queue to track completed vs. pending store instructions and compare to those in the store instruction window.

At step 226, it is determined whether all the store instructions that the load instruction is dependent upon have executed based on the pointer and bit vector. If all the store instructions identified as having dependencies by the pointer and bit vector have not executed, processing continues at a loop back to step 224, with execution of additional store instructions not specifically depicted in FIG. 2. If all the store instructions identified as having dependencies by the pointer and bit vector have executed, processing may continue to step 228, at which the load instruction is executed. After the load instruction has been executed, processing continues to step 230.

At step 230, it is determined if an additional dependency has been identified for the load instruction executed at step 228. For example, in some instances another store instruction may be executed (not depicted between steps 228 and 230) that the load instruction was dependent upon but that was not identified within the store instruction window data's pointer and bit vector. This step is similar to that previously described in step 206, where the only difference is that instead of additional store execution 204, the additional store execution mentioned between steps 228 and 230 takes place. If another dependency is identified, processing may return to steps 208-214 to flush and fetch the load instruction, update the pointer as necessary (e.g., if the store instruction identified at step 230 is newer than the store instruction currently identified by the pointer), and update the bit vector as necessary (e.g., if the store instruction identified at step 230 is within the store instructions covered by the bit vector, changing the corresponding value within the bit vector to a "1"). If a further dependency is not found at step 230, processing returns to step 216 to update the confidence value based on the successful execution of the load instruction and continue processing additional instructions.

FIG. 3 depicts an exemplary dependency window data structure 300 in accordance with some embodiments of the present disclosure. Although the dependency window data structure is configured in a particular manner with certain types of information and data formats, it will be understood that in some embodiments the dependency window data structure can include additional information or that information may be omitted (e.g., the confidence value may be omitted).

In the embodiment depicted in FIG. 3, each row provides dependency window data for a particular load instruction. Each load instruction is identified such as by a unique identifier (e.g., in the first column of the dependency window data structure) and includes dependency data for that load instruction. As an example, a second column includes a confidence value (e.g., as determined at step 216 of FIG. 2) while the third and fourth columns include the store instruction window information (e.g., pointer and bit vector). In the embodiment depicted in FIG. 3, the confidence value is a number that is incremented with each successful execution of the corresponding load instruction and decremented with executions that result in a flushing and fetching of the load instruction. The bit vector includes 8 bits, with each bit corresponding to a store instruction in the sequence of store instructions, and the least significant bit corresponding to the first store instruction after the store instruction identified by the pointer. The pointer value is a numerical value pointing to the newest store instruction that the load instruction is dependent upon, with zero corresponding to the newest store instruction after the load instruction, one corresponding to the second newest store instruction after the load instruction, and so on. In this manner, the dependency window data structure includes all the information necessary to track multiple dependencies for a load instruction within a compact data structure that can be implemented and analyzed with minimal hardware cost and processing overhead. The bit vector in this example shows 8 bits allowing tracking of multiple store dependencies, but in some embodiments, the number of bits can be selected to be a different fixed value. Though a bit vector was chosen for compactness, another structure can be used where each store instruction in the dependency table corresponds to an indicator of some sort. In some cases, the number of indicators used can be only a subset of the fixed value of bits, because store instructions that are not dependent on the load instruction can be ignored for this store instruction window. In some embodiments, the size of the dependency window can be dynamically adjusted based on workloads and spread of predicted dependencies. For example, a smaller window (i.e. with fewer bits) could be used during smaller workloads, while a larger window could be used when more complex dependencies or more intervening store dependencies are present. In some embodiments, other structures for the dependency window data can be used, such as using a content-addressable memory to map load instructions and storing pointers and bit vectors similarly to the table as described previously while minimizing latency. In some embodiments, dependencies can be tracked using a software-based scheduler, which can dynamically allocate dependencies using linked lists, hashmaps, and the like. In some embodiments, combinations of these approaches are also possible.

Figure 4:
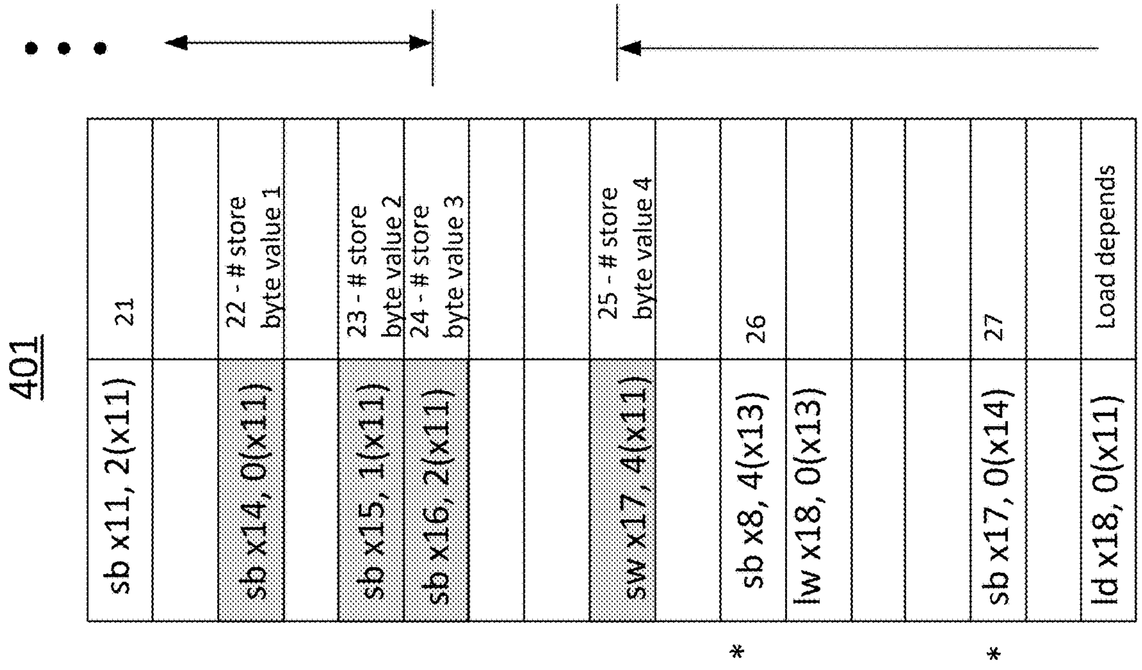
FIG. 4 is an example of sequences of instructions in accordance with specific embodiments of the invention.
Figure 4:
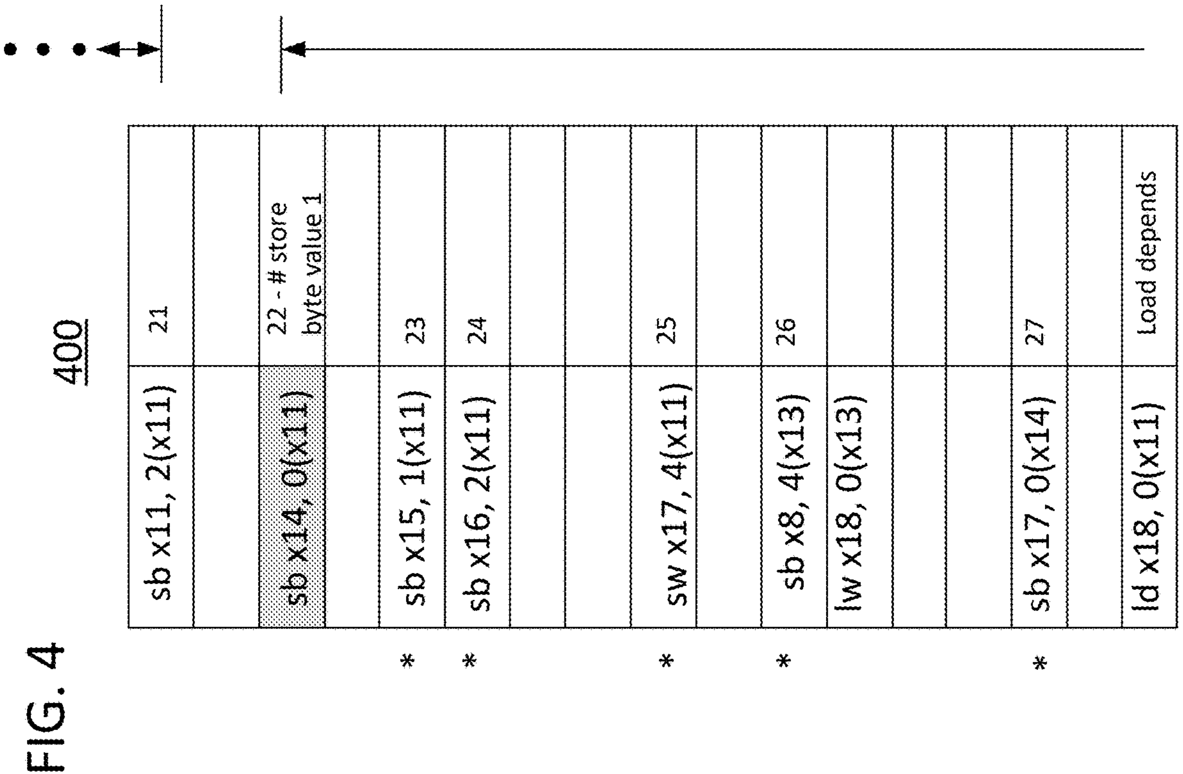

FIG. 4 depicts an exemplary sequence of instructions with two different pointer values associated with a load instruction in accordance with some embodiments of the present disclosure. As depicted in FIG. 4, a common sequence of instructions is depicted in both example 400 and example 401. The left-hand column of each of example 400 and 401 includes the instruction identifiers while the right-hand column includes a sequence number for the store instructions and additional information for the instruction if the load instruction (e.g., Id x18, 0(x11)) has been identified as dependent upon the store instruction. Where no instruction identifiers are depicted, the instruction is not of a store or load instruction type (e.g., is an arithmetic instruction). Identified dependencies of store instructions are further identified by gray shading in the left-side column for the respective store instruction.

In example 400 to the left, the newest store instruction that the load instruction Id x18, 0(x11) has been identified as having a dependency from is store instruction sb x14, 0(x11), having a sequence number of 22. Accordingly, there are five store instructions (e.g., having sequence numbers 23, 24, 25, 26, and 27) between the load instruction and the newest store instruction with dependency, resulting in a pointer value of 5. In example 400, the bit vector begins with the next oldest store instruction after store instruction 22 (i.e., store instruction 21).

In example 401 to the right, the newest store instruction that the load instruction Id x18, 0(x11) has been identified as having a dependency from is store instruction sw x17, 4 (x11), having a sequence number of 25. Accordingly, there are two store instructions (e.g., having sequence numbers 26 and 27) between the load instruction and the newest store instruction with dependency, resulting in a pointer value of 2. In example 401, the bit vector begins with the next oldest store instruction (e.g., store instruction 24) after store instruction 25, and the store instructions 24, 23, and 22 are identified as a source of dependencies (bit vector values not depicted in FIG. 4).

Figure 5:
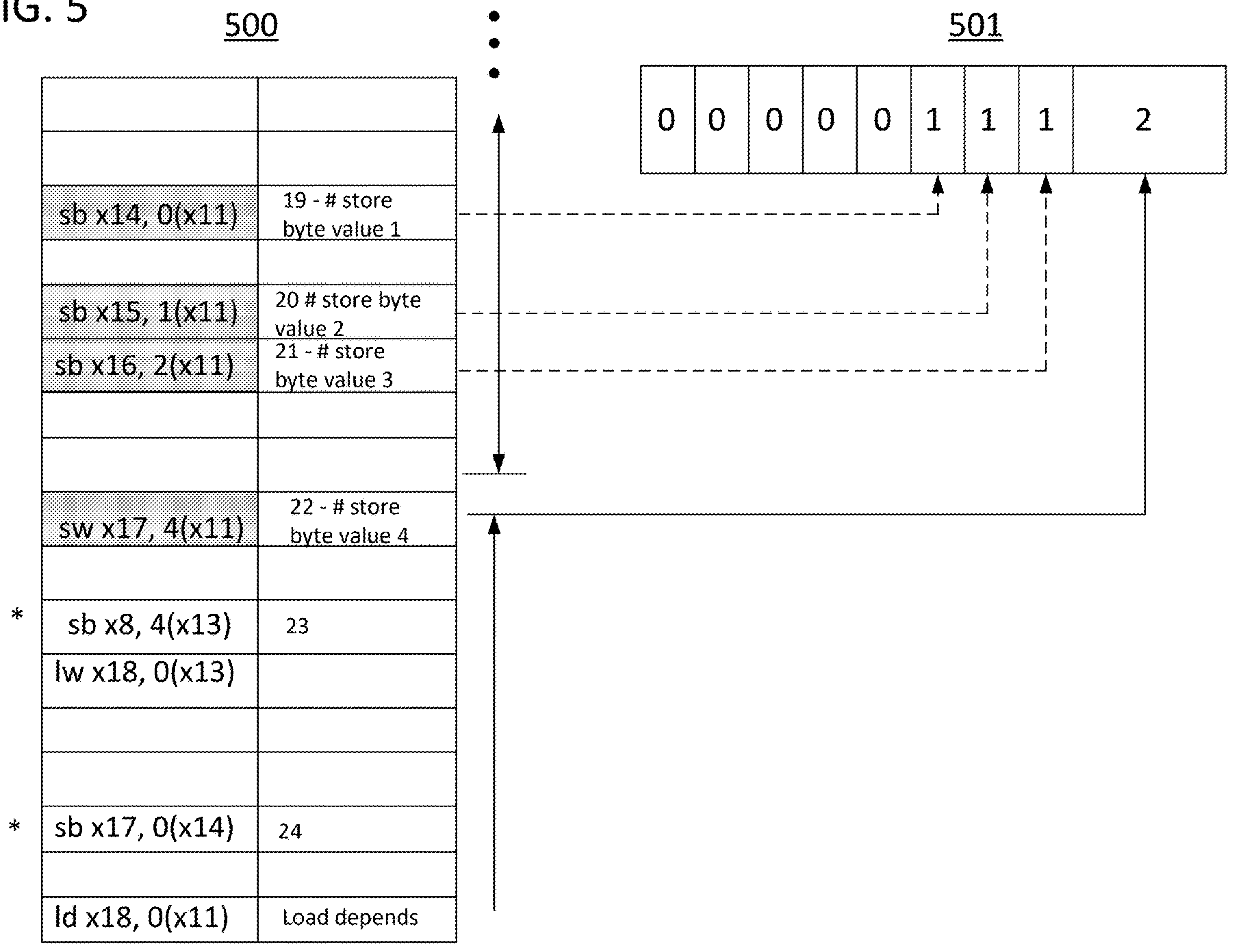
FIG. 5 is an example of a sequence of instructions with an associated pointer and bit vector in accordance with specific embodiments of the invention.

FIG. 5 depicts an exemplary sequence of instructions 500 with a pointer value and associated bit vector 501 in accordance with some embodiments of the present disclosure. In the sequence of instructions 500, the newest store instruction that the load instruction Id x18, 0(x11) has been identified as having a dependency from is store instruction sw x17, 4 (x11), having a sequence number of 22. Accordingly, there are two store instructions (e.g., having sequence numbers 23 and 24) between the load instruction and the newest store instruction with dependency, resulting in a pointer value of 2. For the sequence of instructions 500, the bit vector begins with the next oldest store instruction (e.g., store instruction 21) after store instruction 22, and the store instructions 21, 20, and 19 are also identified as a source of dependencies. The bit vector includes binary values of "1" corresponding to store instructions 21, 20, and 19, while all other values are "0" indicating that there are no dependencies between store instructions 18, 17, 16, 15, or 14 (not depicted) and the load instruction.

Figure 6:
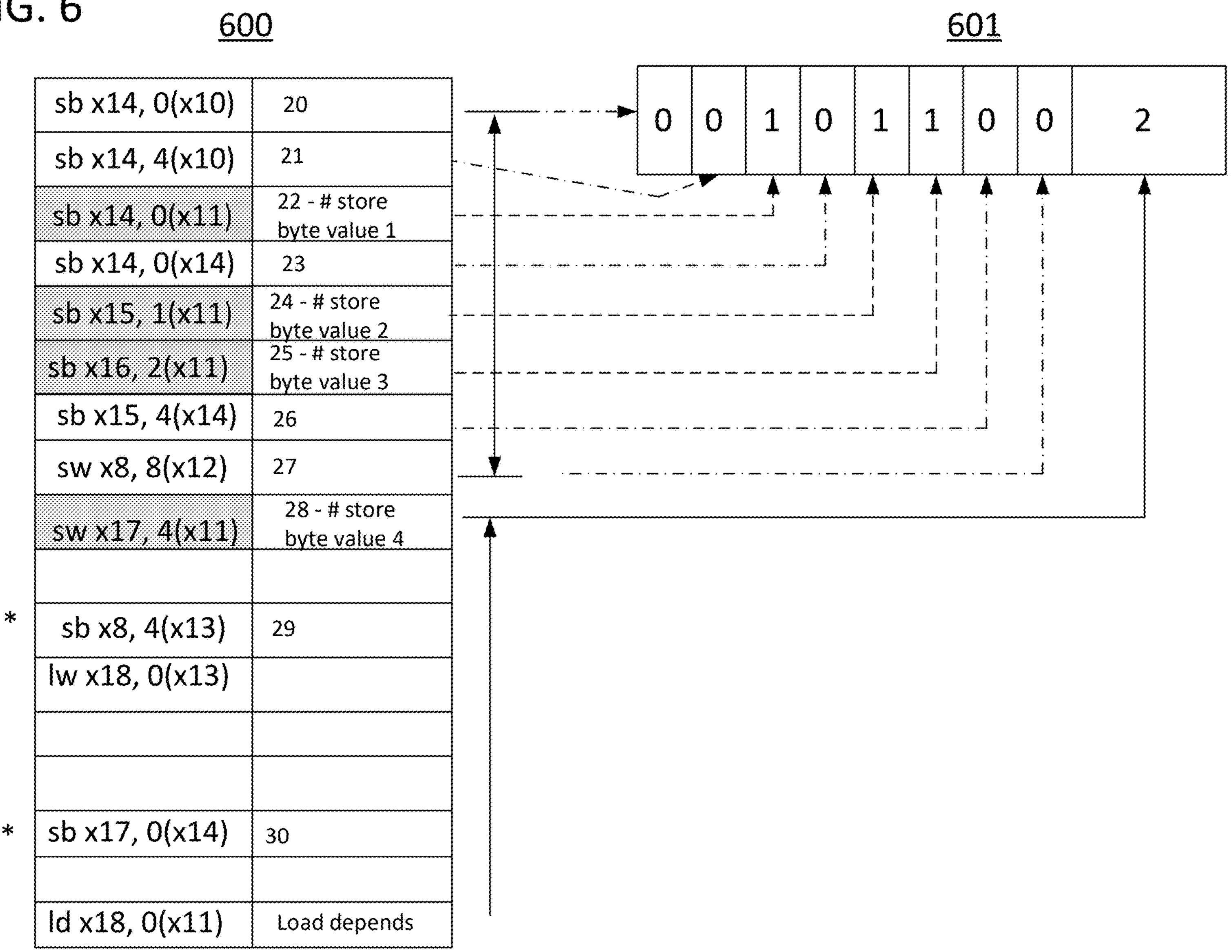
FIG. 6 is an example of a sequence of instructions with an associated pointer and bit vector in accordance with specific embodiments of the invention.

FIG. 6 depicts an exemplary sequence of instructions 600 with a pointer value and associated bit vector 601 in accordance with some embodiments of the present disclosure. In the sequence of instructions 600, the newest store instruction that the load instruction Id x18, 0(x11) has been identified as having a dependency from is store instruction sw x17, 4 (x11), having a sequence number of 28. Accordingly, there are two store instructions (e.g., having sequence numbers 29 and 30) between the load instruction and the newest store instruction with dependency, resulting in a pointer value of 2. In this example, both the pointer as well as the bit vector can be stored in a dependency window data structure such as structure 300.

For the sequence of instructions 600, the bit vector begins with the next oldest store instruction (e.g., store instruction 27) after store instruction 28, and the store instructions 25, 24, and 22 are also identified as a source of dependencies. In the example of FIG. 6, additional store instructions 27, 26, 23, 21, and 20 do not result in dependencies with the load instruction, and thus, those values are not depicted with gray shading within sequence of instructions 600. Further, the bit vector includes values of "0" for these store instructions. In this manner, the bit vector of 8 bits depicts dependency of the load instruction with nine total instructions (one for the counter and eight for the bit vector) and provides information that allows the load instruction to be executed out of order despite multiple store instructions having dependencies, while not waiting for store instructions where a dependency is not present.

Figure 7:
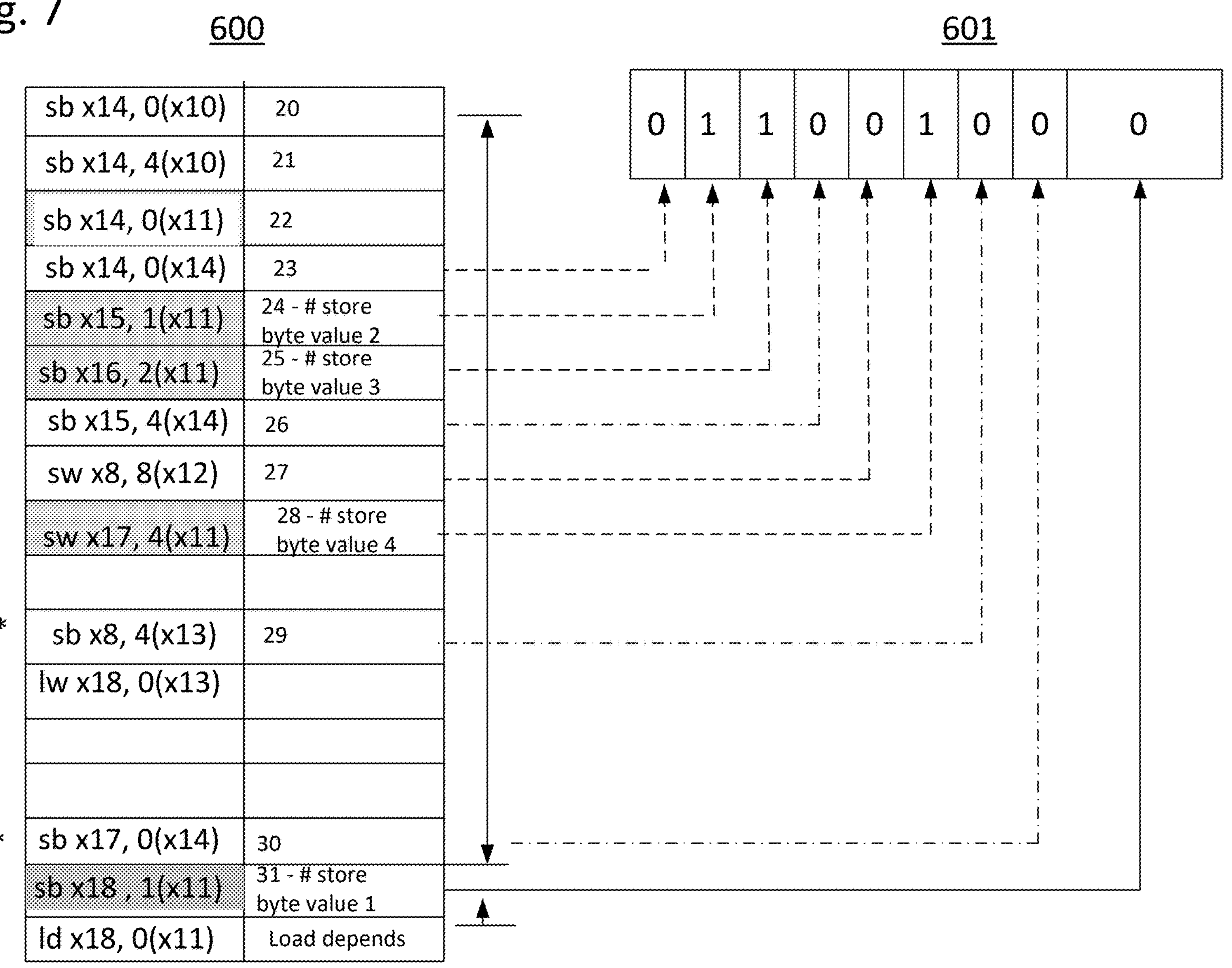
FIG. 7 is an example of a sequence of instructions with an associated pointer and bit vector in accordance with specific embodiments of the invention.

In specific embodiments in which the stores execute out of order and an additional store on which a load depends is found, both the pointer and the bit-vector may need to be updated to account for this other dependency. In specific embodiments, all the data needed to obtain the updated bit vector is available due to the instruction order identifiers such as those in the right column of 600. FIG. 7 provides an example with the same values as in FIG. 6, but with the discovery of another store instruction sb x18, 1 (x11) with identifier 31 on which the load depends. As illustrated, both the pointer and the bit-vector are updated in this case to account for this dependency.

Figure 8:
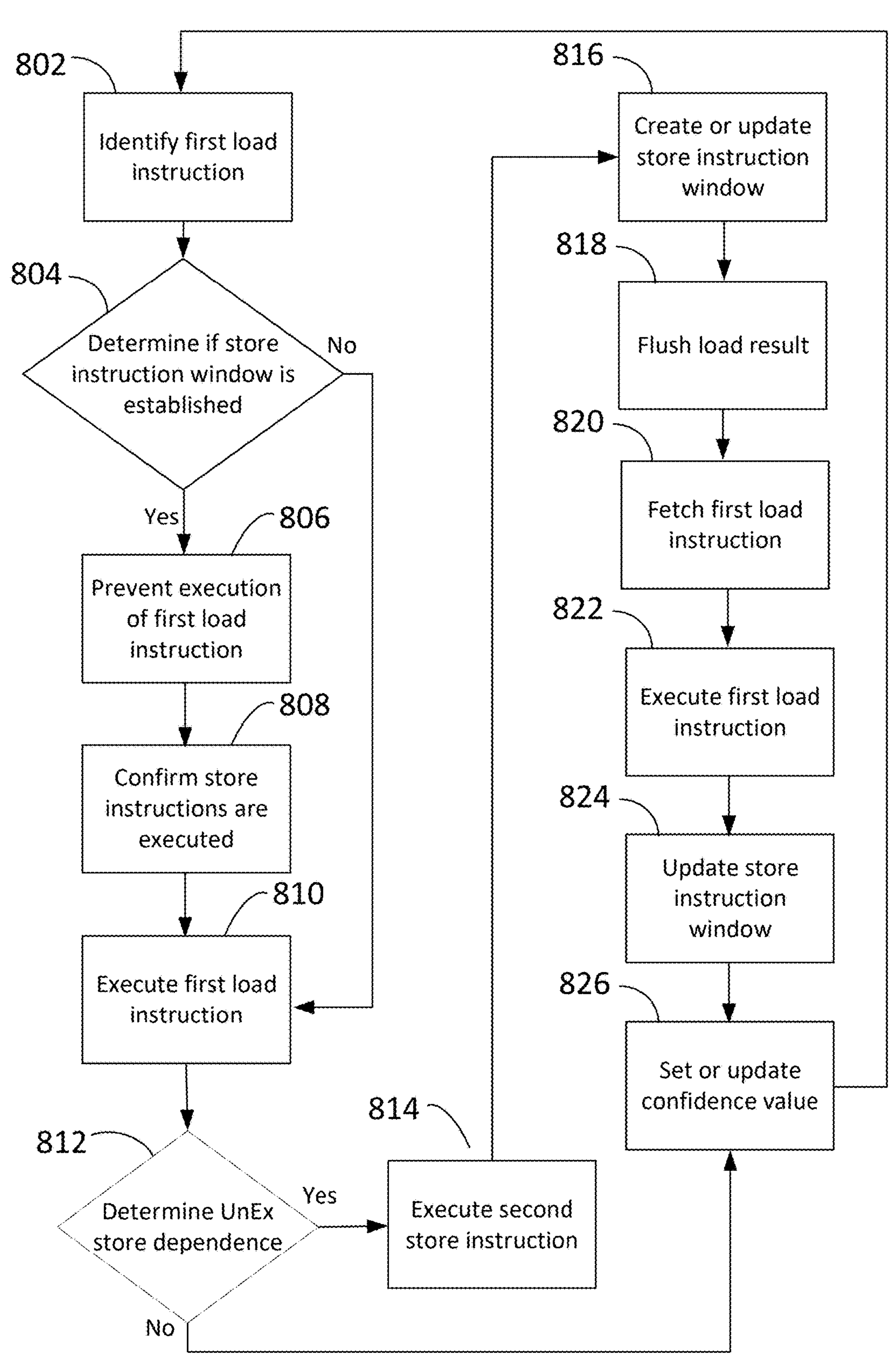
FIG. 8 is a diagram of a process of window-based memory dependency prediction in accordance with specific embodiments of the invention.

FIG. 8 depicts exemplary steps 800 of window-based memory dependency prediction in accordance with an embodiment of the present disclosure. In step 802, a first load instruction is identified for processing. The identification can be the Load ID set in the I-cache. In step 804, it is determined whether a store instruction window has been established in the dependency window data structure for the first load instruction. If there is a store instruction window associated with the Load ID of the first load instruction, then loading is stopped in step 806 until it is confirmed that dependent store instructions listed in the store instruction window have been executed in step 808. Store instructions can be executed at this point as described previously. The first load instruction can then be executed in step 810, either immediately after step 808, or after step 804 if it had been determined that there was no store instruction window established for the first load instruction.

In step 812, it can be determined if there is a second store instruction that was unexecuted, where the first load instruction is dependent on the second store instruction. The second store instruction can be executed thereafter in step 814, though in some cases storage step 814 can be executed before the dependency check in step 812. If there were no unexecuted dependencies, optionally a confidence value can be updated in step 826, and then the loop can repeat back at step 802 with a next load instruction. Where there is an unexecuted dependency, a store instruction window can be created or updated in step 816. Step 816 can consist of several optional steps 818-824. In step 818, any results from a load result are flushed. Next, in step 820, the first load instruction can be fetched and then executed again in step 822. If the store instruction window already existed, it can be updated in step 824 based on information about the second store instruction. In specific embodiments, this information can include a pointer that is pointing to the location of the second store instruction. In specific embodiments, this information can include additional identification of one or more store instructions, that in some cases were already present in the store instruction window. This information about the second store instruction can also be added to a new store instruction window if one was just established. Finally, similarly to before, optionally a confidence value can be updated in step 826, and then the loop can repeat back at step 802 with a next load instruction.

In specific embodiments, the dependency predictor may have a high level of confidence that a particular load instruction has no unresolved store dependencies. In this case, steps 804-808 may be skipped and load instructions executed without checking store window data structures for these particular load instructions. Store instruction dependencies may still be checked in step 812 using I-cache sequence data and other metadata.

In specific embodiments, data dependency structures can be implemented for hierarchical levels on the system. For example, in a system with multiple processors, a process such as process 200 can be implemented for window-based memory dependency prediction at the system level as a whole where dependencies can be tracked for load operations that may be split among various processing elements. At the same time, a similar process can be implemented at a local level where dependency windows can be tracked for local operations.

In specific embodiments in the following paragraphs, a variety of elements may be present pertaining to various means for performing actions.

A means for identifying a first load instruction for processing can include circuitry for examining the Load ID of the load instruction set by the I-cache. This enables the instruction queue to identify which instruction is next to evaluate for execution. This can include a hardware-based instruction decoder that scans the instruction queue for load instructions and associated identification tags or by their opcodes. Alternatively, a load-store module can use software-based methods to flag instructions identified as load instructions and parse associated store instructions.

A means for determining, based on the first load instruction, whether a store instruction window has been established for the first load instruction can include circuitry for checking the dependency window data structure which is checked for an identifier to the next load instruction. This can be checked sequentially through a table when the set of dependency window data is relatively small. Other implementations such as content addressable memory ("CAM") tables or hash tables can improve the speed of this determination. In some cases, a processor memory management unit can create or maintain other metadata related to load-store dependencies which can be reviewed by circuitry to determine if a store instruction window has been established.

A means for confirming, when the store instruction window has been established, that one or more store instructions, within the store instruction window, that the first load instruction is dependent upon have been executed can include circuitry that tracks store executions in a completion buffer in the load-store module. Alternatively, the load-store module can include a load-store queue to track completed vs. pending store instructions and compare them to those in the store instruction window.

A means for executing the first load instruction when execution of the one or more store instructions has been confirmed can include the standard processor instruction execution circuitry modified with conditional logic circuitry that is coupled to a control signal indicating that execution of the one or more store instructions has been confirmed. For example, an execution control unit can interface with a pipeline to trigger execution of load instructions that have been validated.

A means for determining a determination, when the store instruction window has been established, that at least one store instruction of the one or more store instructions, within the store instruction window, that the first load instruction is dependent upon has not been executed can include circuitry that checks the load-store buffer to ensure all store instructions have finished. In some cases, execution of more than one store instruction referenced in the store instruction window can occur concurrently or consecutively.

A means for preventing execution of the first load instruction based on the determination that the at least one store instruction has not been executed can include control circuitry for removing the first load instruction from an instruction pipeline that is coupled to a control signal indicating the store instruction has not been executed. In some cases, the identification data in the store instruction window can be checked to ensure the store instruction window is still valid and should pause the load instruction from executing.

A means for determining, after the execution of the first load instruction, that an additional store instruction that the first load instruction is dependent upon was not executed can include a dependency verifier to compare executed store instructions vs. the dependency window for the load instruction. The scheduler may have already tagged various store instructions as being dependencies for the first load instruction, however additional dependencies can be found after this point and tagged after the store instruction window was created or updated earlier.

A means for flushing a result of the first load instruction can include circuitry for clearing the value of the register that was updated by the first load instruction. The circuitry can include standard circuitry in out-of-order processing architectures for flushing instruction results when faults are detected. This might also include circuitry for setting a flag to mark the register as containing invalid or stale data. The means can also be hardware rollback mechanisms such as a reorder buffer or an execution unit to clear erroneous values from associated registers, or by software exception handlers that detect dependency violations and flush results.

A means for fetching the first load instruction after execution of the additional store instruction can include an instruction fetch unit to retrieve the first load instruction information and reset its position in the instruction cache for re-execution or may be accomplished using an instruction queue adjustment module to reorder instructions.

A means for executing the first load instruction after the fetching can include means as previously presented for executing load instructions.

A means for updating the store instruction window based on the additional store instruction can include updating a pointer and other indicators that refer to the additional store location. A window management module can verify or reconfigure the store instruction window as instructions are updated. In some cases, the management module can remove store instructions from the window if it is determined that they are no longer dependencies to a particular load instruction. Store instruction windows can be implemented efficiently with fixed-size hardware buffers for pointers and bit vectors. They can also be implemented with circular buffers or arrays that are dynamically allocated with fixed or variable sizes. In some cases, a store instruction window can be implemented with a bit vector or other indicators alone with no pointers. In some cases, the store instruction window can be implemented with lists of linked pointers to various store instructions without other indicators such as a bit vector.

A means for updating a pointer of the store instruction window to point to the additional store instruction can include a counter to calculate the offset between the newest identified store instruction dependency and the first load instruction.

A means for updating an identification of the one or more store instructions that the first load instruction is dependent upon can include circuitry for adjusting indicators that point to older store instructions that are still dependencies. Indicators can be implemented as bit vectors or other options previously described.

A means for executing the first load instruction when the store instruction window has not been established can include means as previously presented for executing load instructions with conditional logic coupled to a signal indicating that the store instruction window has not been established.

A means for determining, after the execution of the first load instruction, that a second store instruction that the first load instruction is dependent upon was not executed can include circuitry for checking the instruction cache for updates by the scheduler where store instructions have been tagged as dependencies for a specific load instruction ID or opcode. At this point, the store instruction window was already tested and confirmed to have executed, so dependency errors are most likely caused by newer store dependencies. In some cases, a separate dependency verifier can be used that checks and matches store and load memory locations rather than identifiers to test for additional dependencies that might have been missed earlier. In some cases, sequencing data assigned by the scheduler can be checked for ordering to determine dependencies.

A means for creating the store instruction window based on the second store instruction can include circuitry for adding a new row entry to the existing dependency window data structure. This can also include generating a new pointer and creating a blank or minimal bit vector or other indicators. In some cases, data about the second store instruction can also be included in the bit vector as well as the pointer.

A means for adjusting a confidence value of a store instruction window following execution of the first load instruction can include circuitry for incrementing or otherwise increasing the confidence level of the store instruction window when a load operation with store dependencies in the store instruction window has been executed without any dependency errors. In some cases, confidence can be lowered when there are no errors, but unneeded store instructions were executed. Confidence values can be decremented or otherwise lowered when a similar load operation is executed without any dependent store instructions that have executed. In some cases, other heuristics from past dependency data can be used to adjust confidence values. Confidence values can also be set or adjusted dynamically using data such as number of associated dependent store instructions.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, while the specification has been focused on load instructions being dependent upon multiple store instructions, the present disclosure may also apply to other implementations of out-of-order processing of instructions having possible dependencies upon other instructions. For example, in specific embodiments, the same approaches are directed to store instructions that are dependent upon multiple load instructions. These and other modifications and variations to the present invention may be practiced by those skilled in the art, without departing from the scope of the present invention, which is more particularly set forth in the appended claims.

What is claimed is:

1. A method for out-of-order instruction processing, comprising:
- identifying a first load instruction for processing;
- determining, based on the first load instruction, whether a store instruction window has been established for the first load instruction;
- confirming, when the store instruction window has been established, that one or more store instructions, within the store instruction window, that the first load instruction is dependent upon have been executed; and
- executing the first load instruction after execution of the one or more store instructions has been confirmed;
- wherein the store instruction window comprises a pointer and an identification of one or more store instructions that the first load instruction is dependent upon;
- wherein the pointer comprises an offset to a newest store instruction of the one or more store instructions that the first load instruction is dependent upon; and
- wherein the offset comprises a count of a number of store instructions between the newest store instruction and the first load instruction.

2. The method of claim 1, wherein the identification of the one or more store instructions that the first load instruction is dependent upon includes a fixed number of store instructions that are older than the newest store instruction.

3. The method of claim 2, wherein the identification of the one or more store instructions that the first load instruction is dependent upon includes indicators for a subset of the fixed number of store instructions.

4. The method of claim 3, wherein each indicator of the indicators comprises a bit indicating whether the first load instruction depends upon a respective store instruction of the fixed number of store instructions.

5. The method of claim 4, wherein the indicators are arranged in a bit vector.

6. The method of claim 3, wherein the newest store instruction is also referenced by the indicators.

7. The method of claim 1, further comprising:
- determining a determination, when the store instruction window has been established, that at least one store instruction of the one or more store instructions, within the store instruction window, that the first load instruction is dependent upon has not been executed; and
- preventing execution of the first load instruction after execution based on the determination that the at least one store instruction has not been executed.

8. The method of claim 1, further comprising:
- determining, after the execution of the first load instruction, that an additional store instruction that the first load instruction is dependent upon was not executed;
- flushing a result of the first load instruction;
- fetching the first load instruction after execution of the additional store instruction;
- executing the first load instruction after the fetching; and
- updating the store instruction window based on the additional store instruction.

9. The method of claim 8, wherein the updating the store instruction window based on the additional store instruction comprises updating a pointer of the store instruction window to point to the additional store instruction.

10. The method of claim 9, wherein the updating the store instruction window based on the additional store instruction further comprises updating an identification of the one or more store instructions that the first load instruction is dependent upon.

11. The method of claim 1, further comprising:

executing the first load instruction when the store instruction window has not been established;

determining, after the execution of the first load instruction, that a second store instruction that the first load instruction is dependent upon was not executed; and creating the store instruction window-based on the first store instruction.

12. The method of claim 1, further comprising:

adjusting a confidence value of a store instruction window following execution of the first load instruction, wherein the confidence value is increased when the first load instruction is executed without additional unexecuted dependency errors; and the confidence value is decreased when the first load instruction is executed with at least one additional unexecuted dependency error.

13. A system for out-of-order instruction processing, comprising:

means for identifying a first load instruction for processing;

means for determining, based on the first load instruction, whether a store instruction window has been established for the first load instruction;

means for confirming, when the store instruction window has been established, that one or more store instructions, within the store instruction window, that the first load instruction is dependent upon have been executed; and means for executing the first load instruction when execution of the one or more store instructions has been confirmed;

wherein the store instruction window comprises a pointer and identification of the one or more store instructions that the first load instruction is dependent upon;

wherein the pointer comprises an offset to a newest store instruction of the one or more store instructions that the first load instruction is dependent upon; and wherein the offset comprises a count of a number of store instructions between the newest store instruction and the first load instruction.

14. The system of claim 13, wherein the identification of the one or more store instructions that the first load instruction is dependent upon includes a fixed number of store instructions that are older than the newest store instruction.

15. The system of claim 14, wherein the identification of the one or more store instructions that the first load instruction is dependent upon includes indicators for a subset of the fixed number of store instructions.

16. The system of claim 15, wherein each indicator of the indicators comprises a bit indicating whether the first load instruction depends upon a respective store instruction of the fixed number of store instructions.

17. The system of claim 16, wherein the indicators are arranged in a bit vector.

18. The system of claim 15, wherein the newest store instruction is also referenced by the indicators.

19. The system of claim 13, further comprising:

means for determining a determination, when the store instruction window has been established, that at least one store instruction of the one or more store instructions, within the store instruction window, that the first load instruction is dependent upon has not been executed; and means for preventing execution of the first load instruction based on the determination that the at least one store instruction has not been executed.

20. The system of claim 13, further comprising:

means for determining, after the execution of the first load instruction, that an additional store instruction that the first load instruction is dependent upon was not executed;

means for flushing a result of the first load instruction;

means for fetching the first load instruction after execution of the additional store instruction;

means for executing the first load instruction after the fetching; and means for updating the store instruction window based on the additional store instruction.

21. The system of claim 20, wherein the means for updating the store instruction window based on the additional store instruction comprises:

means for updating a pointer of the store instruction window to point to the additional store instruction.

22. The system of claim 21, wherein the means for updating the store instruction window based on the additional store instruction further comprises:

means for updating an identification of the one or more store instructions that the first load instruction is dependent upon.

23. The system of claim 13, further comprising:

means for executing the first load instruction when the store instruction window has not been established;

means for determining, after the execution of the first load instruction, that a second store instruction that the first load instruction is dependent upon was not executed; and means for creating the store instruction window based on the second store instruction.

24. The system of claim 13, further comprising:

means for adjusting a confidence value of a store instruction window following execution of the first load instruction;

wherein the confidence value is increased when the first load instruction is executed without additional unexecuted dependency errors, and the confidence value is decreased when the first load instruction is executed with at least one additional unexecuted dependency error.

* * * * *